(12) United States Patent
Meader

(10) Patent No.: US 6,286,907 B1
(45) Date of Patent: Sep. 11, 2001

(54) SKATE WHEEL WITH INTERNAL RADIAL SUPPORT

(75) Inventor: Allen L. Meader, Port Orchard, WA (US)

(73) Assignee: K-2 Corporation, Vashon, WA (US)

( * ) Notice: Subject to any disclaimer, the term of this patent is extended or adjusted under 35 U.S.C. 154(b) by 0 days.

(21) Appl. No.: 09/127,403

(22) Filed: Jul. 31, 1998

(51) Int. Cl.[7] .................................................. B60C 7/24
(52) U.S. Cl. ................................................ 301/5.3; 152/393
(58) Field of Search ........................... 301/5.3, 5.7, 64.7; 152/393, 394; 280/11.22, 11.23

(56) References Cited

U.S. PATENT DOCUMENTS

| | | | |
|---|---|---|---|
| 908,475 | * | 1/1909 | Midgley et al. ................... 152/394 X |
| 949,001 | * | 2/1910 | Merigoux ............................. 152/394 |
| 1,004,318 | * | 9/1911 | Watts et al. . |
| 1,038,576 | * | 9/1912 | Heinss . |
| 1,067,361 | * | 7/1913 | Midgley et al. .................. 152/393 X |
| 1,067,949 | * | 7/1913 | Temple . |
| 1,166,155 | * | 12/1915 | Seidel ............................... 152/394 X |
| 1,351,784 | * | 9/1920 | Orbin . |
| 1,397,448 | * | 11/1921 | Norris ..................................... 152/13 |
| 4,164,251 | * | 8/1979 | Chung ................................. 152/32.3 |
| 5,129,709 | * | 7/1992 | Klamer ................................... 301/5.3 |
| 5,320,418 | * | 6/1994 | Chen ................................. 152/323 X |
| 5,393,078 | * | 2/1995 | Bourdeau ........................... 301/5.3 X |
| 5,560,685 | * | 10/1996 | DeBortoli .............................. 301/5.3 |
| 5,567,019 | * | 10/1996 | Raza et al. ............................ 301/5.3 |
| 5,655,784 | * | 8/1997 | Lee .................................... 301/5.3 X |
| 5,660,447 | * | 8/1997 | Angelici ................................ 301/5.7 |
| 5,725,284 | * | 3/1998 | Boyer .................................... 301/5.3 |
| 5,853,225 | * | 12/1998 | Huang ................................... 301/5.3 |
| 5,897,170 | * | 4/1999 | Keleny ................................... 301/5.3 |

* cited by examiner

*Primary Examiner*—Russell D. Stormer
(74) *Attorney, Agent, or Firm*—Christensen O'Connor Johnson Kindness PLLC

(57) ABSTRACT

A skate wheel (10) for use on in-line skates, conventional skates, skateboards, and the like. The wheel includes a centrally located hub (12). The skate wheel (10) also includes an annular interlock flange (14) integrally formed around the perimeter of the hub. Extended around a radial perimeter of the interlock flange is a tubular, radial reinforcement, such as a coil spring (18). The ends of the coil spring are joined to form a tubular ring concentric with the annular interlock flange. An elastomeric tire (20) envelops the coil spring.

4 Claims, 4 Drawing Sheets

SKATE WHEEL WITH INTERNAL RADIAL SUPPORT

FIELD OF THE INVENTION

The present invention relates generally to skate wheels and, in particular, to a skate wheel having internal radial support.

BACKGROUND OF THE INVENTION

Both speed and comfort are important considerations in the design of a skate wheel. To increase speed, the wheel, including an elastomeric tire secured around a hub assembly, should be designed to reduce rolling resistance. That is, the distortion of the elastomeric tire during skating should be lessened to reduce the surface contact between the tire and the ground, thereby reducing friction between the tire and the ground and increasing speed.

Prior attempts to reduce rolling resistance involved varying the diameter of the hub assembly of the wheel or providing an annular flange protruding perpendicularly from the hub assembly of the wheel into the tire interior. However, these attempts created a major drawback. The narrow profile of the annular flange limits its effectiveness in supporting the tire to reduce rolling resistance. Therefore, to support the tire more effectively, the diameter of the annular flange is greatly increased. However, the great increase in the diameter of the annular flange also causes a reduction in the rebound characteristics of the tire, making the wheel harsh to skate on with insufficient shock absorption. Either speed or comfort had to be sacrificed.

Thus, there exists a need for a skate wheel that reduces rolling resistance to increase speed, while maintaining the smoothness and comfort of the skating experience.

SUMMARY OF THE INVENTION

The present invention is a skate wheel for use on in-line skates, conventional roller skates, skateboards, and the like. The skate wheel has a centrally located hub. An annular interlock flange is integrally formed with the hub and protrudes radially about the perimeter of the hub. In a preferred embodiment, a coil spring is received within a groove defined about a radial perimeter of the annular interlock flange. The coil spring extends around the annular interlock flange and the ends of the coil spring are joined, preferably by welding or crimping, to form a tubular ring concentric with the annular interlock flange. An elastomeric tire is cast around the coil spring.

The diameter of the coil spring in relation to the thickness of the tire and the distance between the coil spring and the perimeter of the tire are such that the coil spring provides sufficient support for the tire to reduce rolling resistance, while permitting sufficient deflection to provide for grip between the tire and the ground. In addition, the shape of the coil spring approximates the perimeter of the tire to provide support more effectively and reduce deflection of the tire, while maintaining comfort for a user of the skates.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
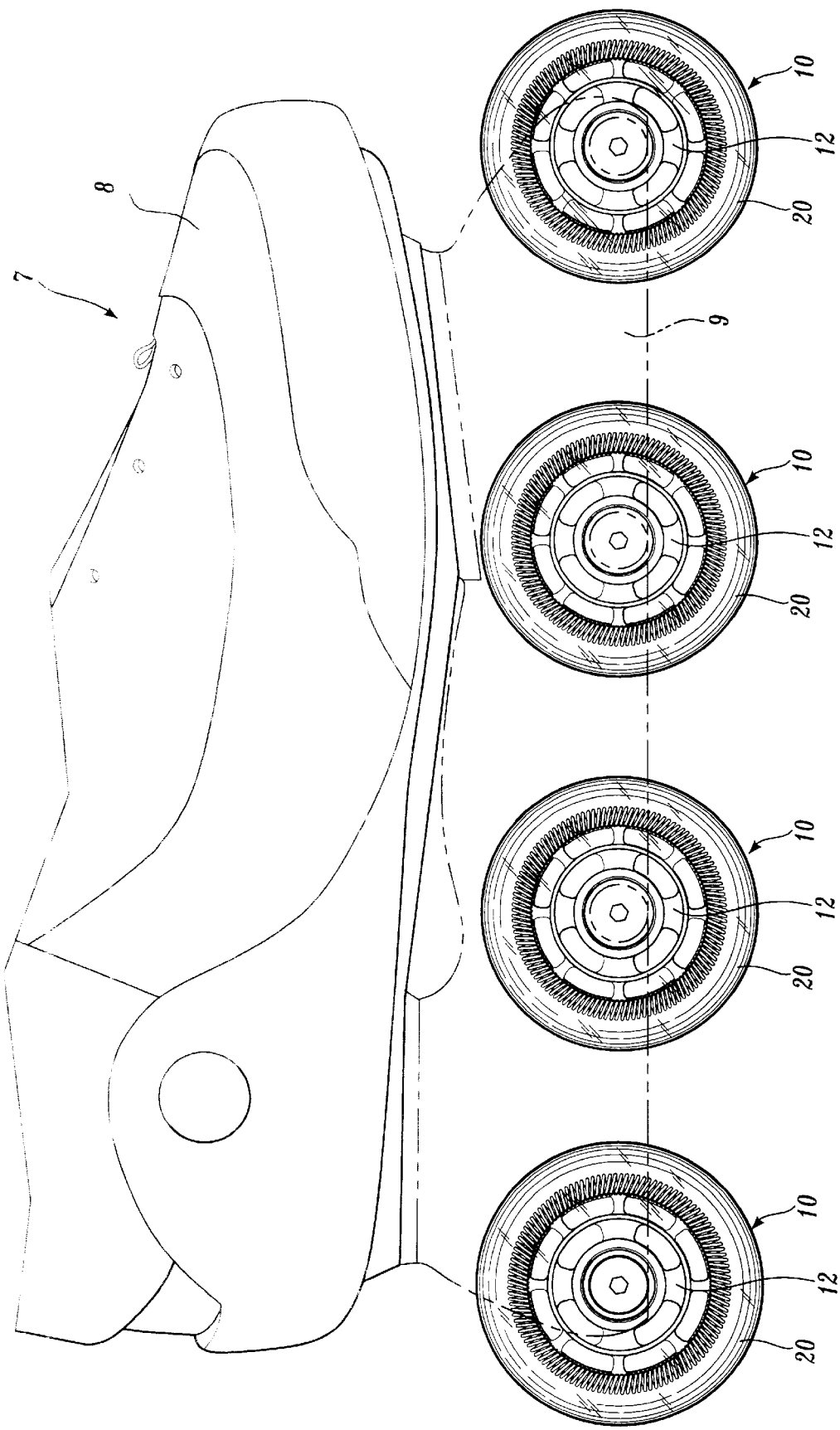
FIG. 1 is a side view of a preferred embodiment of a skate constructed in accordance with the present invention, with the frame shown in phantom.
Figure 3:
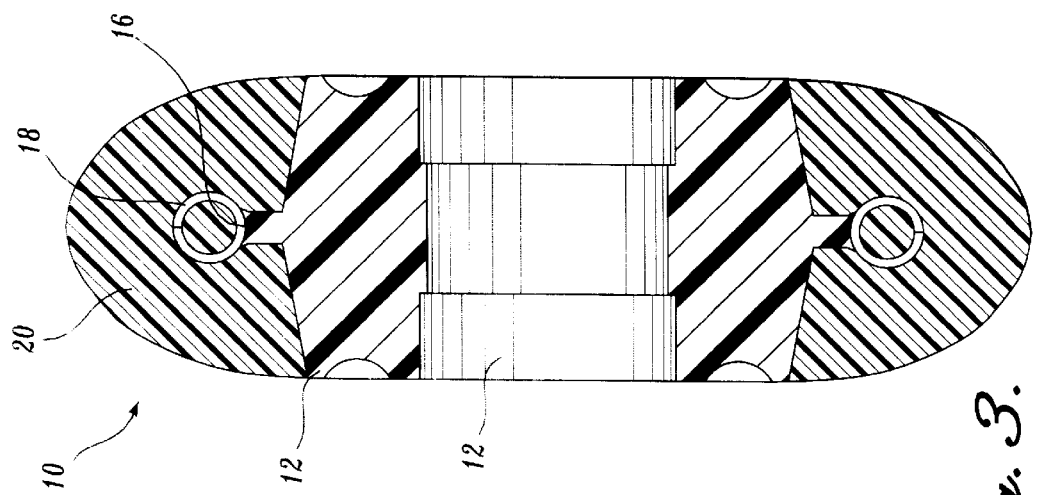
FIG. 3 is a cross-sectional view front view of the wheel of FIG. 2.
Figure 2:
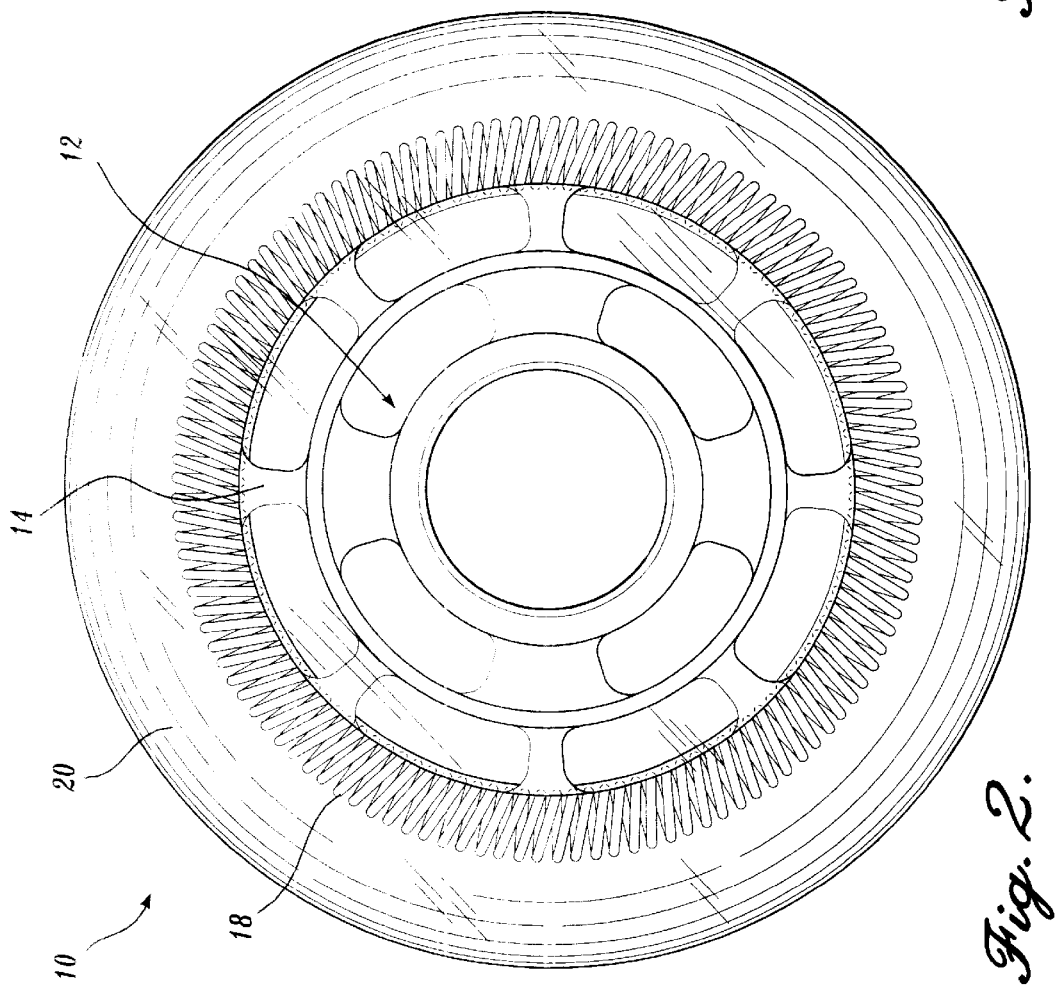
FIG. 2 is an enlarged side view of a wheel of the skate of FIG. 1, with the tire illustrated as translucent.

Referring to FIGS. 1 and 2, a skate 7 includes an upper shoe portion 8, a frame 9 and a plurality of longitudinally aligned wheels 10 constructed in accordance with a preferred embodiment of the present invention. The wheels 10 are joinable between opposing side walls of the frame 9, in accordance with conventional technologies. Each wheel 10 includes a centrally located hub 12 surrounded by an elastomeric tire 20. An annular interlock flange 14, preferably integrally formed with the hub 12, protrudes about the perimeter of the hub 12. The annular interlock flange 14 is oriented orthogonally to the axis of wheel rotation, and is centered in the width of the hub. An annular groove 16 is formed in a radial perimeter of the annular interlock flange 14, and is dimensioned to seat a coil spring 18, as shown in FIGS. 2 and 3. The width of the flange 14 increases adjacent to groove 16.

The coil spring 18 extends around the annular interlock flange 14, and is preferably tensioned (i.e. expanded) sufficiently such that there is a predetermined degree of some spacing between individual coils. The individual coils are positioned approximately perpendicular to the axis of wheel rotation. The coil spring 18 extends about the entire circumference of the groove 16, and the ends of the coil spring 18 are joined, preferably by crimping or welding the ends together so that the spring is continuous. With the ends joined, the coil spring 18 forms a tubular ring that is concentric with the annular interlock flange 14 and the hub 12, as can be seen in FIGS. 2 and 3.

A conventional elastomeric tire 20 is cast around the radial perimeter of the hub 12, including the flange 14 and the coil spring 18. The tire at least partially, and preferably completely, envelops the radial perimeter and the lateral sides of the windings of the coil spring 18. The radial perimeter of the coil spring 18 is the area of the coil spring 18 opposite the interlock flange 14. The lateral sides of the coil spring 18 includes the annular surfaces of the coil spring between the interlock flange 14 and the radial perimeter. The tire 20 is thus secured by the coil spring 18 and flange 14.

The hub 12, including the annular interlock flange 14, can be formed from any of a variety of relatively rigid materials, such as metal or plastic. The coil spring 18 is formed from a semi-rigid, resilient material. The coil spring 18 may suitably be composed of piano wire. The sectional diameter of the coil spring 18 is less than the width of the hub 12 and tire 20, and may suitably be approximately ¼ of the width of the hub and tire. While the spring 18 is resilient along its length, it is relatively rigid across its width, i.e., in the radial direction of the wheel 10. The flange 14 and spring 18 cooperatively define a profile having a wide head and a narrow stem extending from the hub 12.

In the preferred embodiment, the dimensions of the coil spring 18 and the tire 20 are such that the coil spring supports the tire 20 to reduce the deflection of the tire 20 by a predetermined amount. The reduced deflection decreases the surface area of the flattened contact zone between the tire 20 and the ground. Therefore, friction or rolling resistance is reduced, resulting in increased speed. Equally important, the dimensions of the coil spring 18 and the tire 20 are such that a sufficient amount of deflection is maintained to still provide for grip between the tire 20 and the ground.

More specifically, in the preferred embodiment, the distance between the radial perimeter of the tire 20 and the coil spring 18 is approximately equal to one-third of the thickness of the tire 20. For example, the distance between the perimeter of the tire 20 and the coil spring 18 may be about three to four millimeters, while the total radial thickness of the tire 20 may be about ten millimeters.

Unlike conventional skate wheels in which the profile of the annular flange is narrow, the cross-sectional profile of the coil spring 18 approximates the profile of the tire 20. The axial width of the coil spring 18 therefore more effectively supports the tire 20 to reduce deflection and thereby increase speed, while maintaining enough deflection to provide grip with the ground. At the same time, the distance between the coil spring 18 and the tire 20 is sufficient to provide for a comfortable and smooth skating experience.

Figure 5:
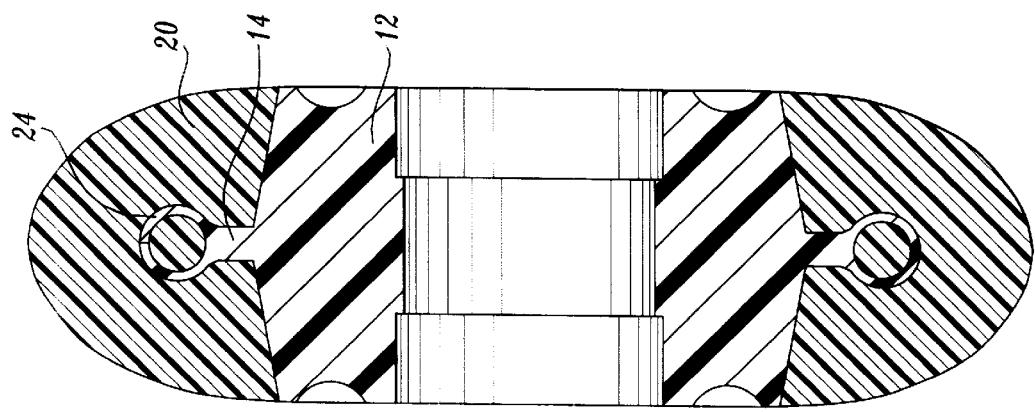
FIG. 5 is a cross-sectional front view of the skate wheel illustrated in FIG. 4.
Figure 4:
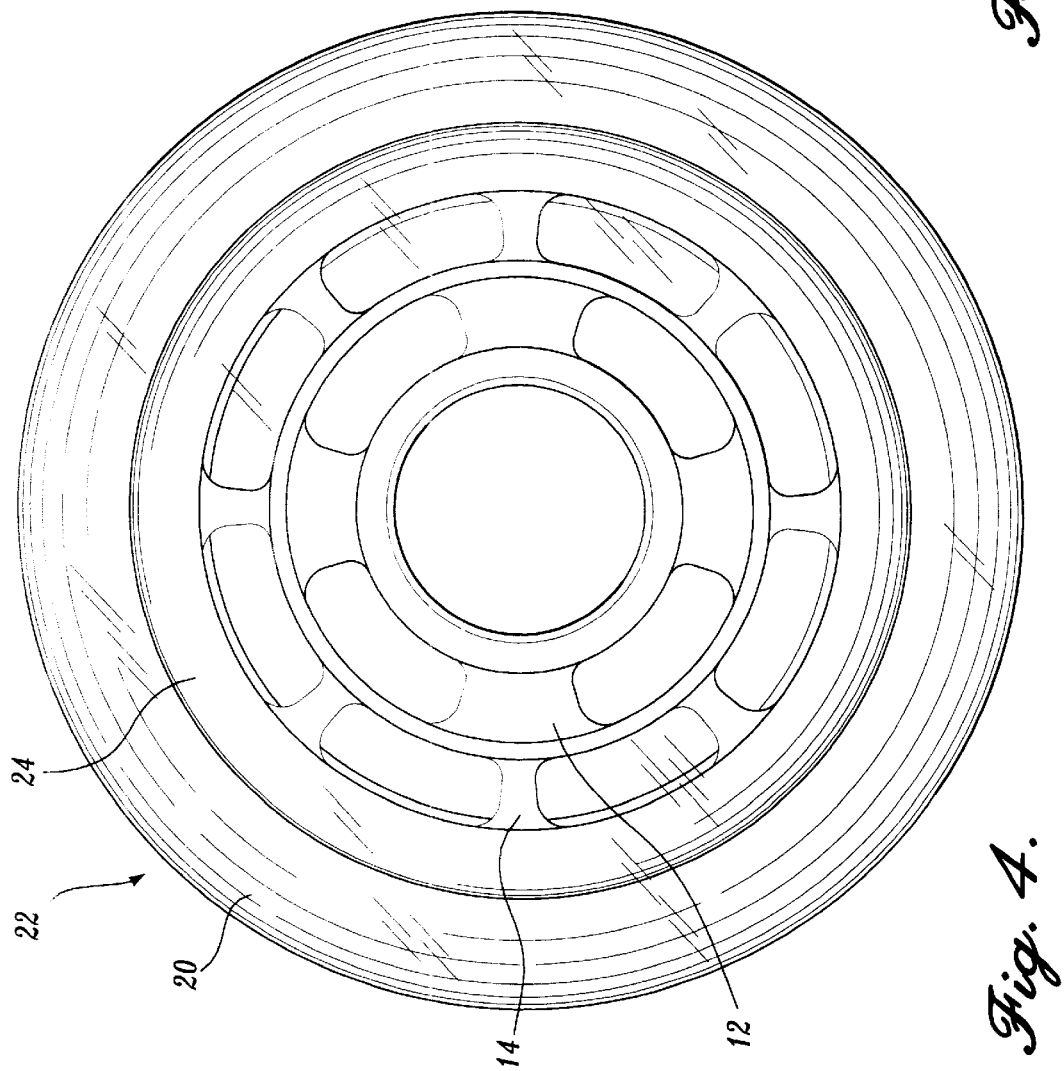
FIG. 4 is a side view of an alternative embodiment of a skate wheel.

Referring to FIGS. 4 and 5, an alternative embodiment of a skate wheel 22 is illustrated. In this alternative embodiment, an annular tube 24, having a circular cross section, is cast as an integral part of the hub 12, defining the radial extremity of the annular interlock flange 14. The circular tube 24 runs around the annular perimeter of the annular interlock flange 14. The circular tube 24, the hub 12 and the interlock flange 14 are formed from any relatively rigid material, such as metal or plastic. The dimensions of the circular tube 24 in relation to the tire 20 are the same as the dimension of the spring 18 in the preferred embodiment. The tube 24 may include a plurality of apertures so that it is filled with the elastomer forming the tire 20 (as shown), or it may be hollow and unfilled, or solid throughout.

Figure 6:
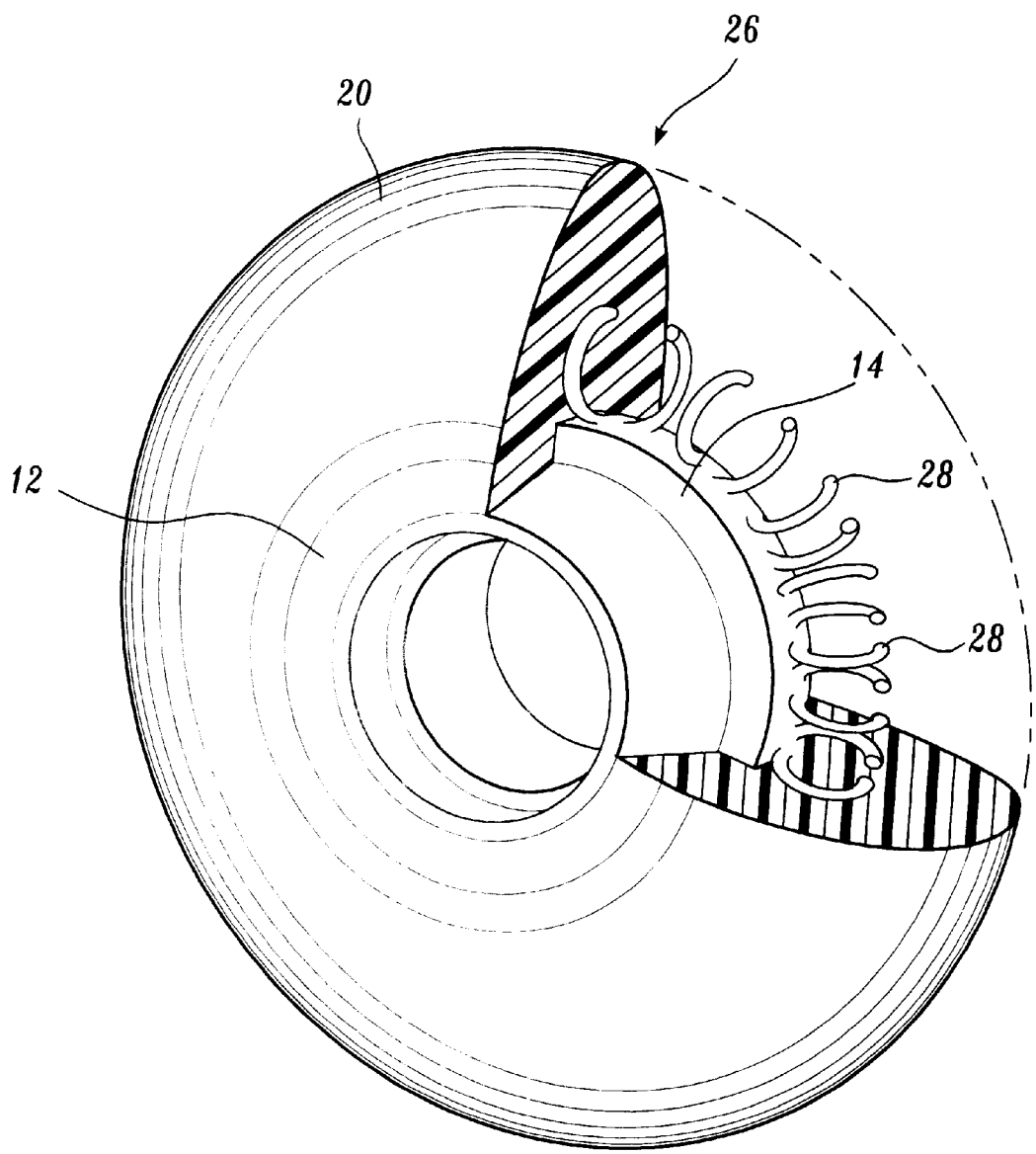
FIG. 6 is a perspective view of another alternative embodiment of a skate wheel.

Referring to FIG. 6, another alternative embodiment of a skate wheel 26 is illustrated. In this embodiment, a number of radially spaced arcuate ribs 28 (or approximately semi-circular rings) are integrally formed with the hub 12 and annular interlock flange 14. The ribs 28 protrude from the radial perimeter of the annular interlock flange 14 and are positioned in an alternating arrangement. That is, the free end of alternating ribs 28 points to the same side of the skate wheel 26, with interposed ribs 28 pointing to the opposite side. The ribs 28 are formed from any relatively rigid material such as metal or plastic. However, the rigidity of the ribs 28 may be increased to support the tire 20 more effectively by injecting the ribs 28 with a glass-filled polymer, filling the spaces therebetween, prior to casting the tire 20.

While the preferred embodiments of the invention has been illustrated and described, it will be appreciated that various changes can be made therein without departing from the spirit and scope of the invention.

The embodiments of the invention in which an exclusive property or privilege is claimed are defined as follows:

1. A skate wheel for mounting below a skate comprising:
   a central hub assembly constructed for rotatable mounting on an underside of a skate;
   an annular reinforcement projecting radially about the hub assembly, the reinforcement comprising an annular stem portion and a wider annular head portion being formed from an annular series of elements each extending both radially and transversely from the annular stem, the annular head portion positioned at a radial perimeter defined by the annular stem portion, the annular head portion defining, a radial perimeter and lateral sides, wherein the annular head portion comprises a coil spring; and
   an elastomeric tire adapted to support a skater and at least partially enveloping the radial perimeter and lateral sides of the annular head portion and defining a central portion, the annular head portion projecting into the annular central portion of the elastomeric tire, wherein the annular head portion is stiffer in a radial direction than the enveloping elastomeric tire.

2. The skate wheel of claim 1, wherein the annular head portion has a tubular profile.

3. The skate wheel of claim 1, wherein the coil spring continuously extends the entire radial perimeter of the annular stem portion.

4. A skate wheel for mounting below a skate comprising:
   a central hub assembly defining a perimeter and constructed for rotatable mounting on an underside of a skate;
   a plurality of arcuate ribs projecting in an alternating arrangement around the perimeter of the hub assembly, each arcuate rib extending both radially and transversely from the hub assembly, the arcuate ribs being aligned about a common annulus; and
   an elastomeric tire adapted to support a skater enveloping the arcuate ribs, the arcuate ribs projecting into an annular central portion of the elastomeric tire.

* * * * *

UNITED STATES PATENT AND TRADEMARK OFFICE
CERTIFICATE OF CORRECTION

PATENT NO.   : 6,286,907 B1  
DATED        : September 11, 2001  
INVENTOR(S)  : A.L. Meader Page 1 of 1

It is certified that error appears in the above-identified patent and that said Letters Patent is hereby corrected as shown below:

<u>Column 4,</u>
Line 22, "defining, a" should read -- defining a --

Signed and Sealed this

Ninth Day of April, 2002

*Attest:*

JAMES E. ROGAN
*Attesting Officer*   *Director of the United States Patent and Trademark Office*